(12) United States Patent
Rosolem et al.

(10) Patent No.: US 7,369,219 B2
(45) Date of Patent: May 6, 2008

(54) ACTIVE WAVELENGTH CONVERTER FOR USE WITH AN OPTICAL TIME-DOMAIN REFLECTOMETER (OTDR) AND METHOD FOR INCREASING OTDR SUPERVISION DISTANCE RANGE

(75) Inventors: João Batista Rosolem, Vila Itapura (BR); Danilo Cesar Dini, Parque Nova Suiça (BR); José Eduardo Urso, Jardim Colina (BR)

(73) Assignee: Fundačao CPQD-Centro De Pesquisa E Desenvolvimento Em Telecominicacoes, Campinas (BR)

( * ) Notice: Subject to any disclaimer, the term of this patent is extended or adjusted under 35 U.S.C. 154(b) by 204 days.

(21) Appl. No.: 11/110,857

(22) Filed: Apr. 21, 2005

(65) Prior Publication Data

US 2006/0238746 A1    Oct. 26, 2006
US 2007/0188740 A2    Aug. 16, 2007

(51) Int. Cl.
*G01N 21/00* (2006.01)

(52) U.S. Cl. .................................... 356/73.1

(58) Field of Classification Search ............... None
See application file for complete search history.

(56) References Cited

U.S. PATENT DOCUMENTS 5,185,635 A * 2/1993 Trent et al. ............... 356/73.1

FOREIGN PATENT DOCUMENTS

JP    09-210847    8/1997
JP    2000-101513  4/2000

* cited by examiner

*Primary Examiner*—Tu T Nguyen
(74) *Attorney, Agent, or Firm*—Finnegan, Henderson, Farabow, Garrett & Dunner, L.L.P.

(57) ABSTRACT

A converter device that changes the wavelength of optical signals originated by an OTDR to supervise optical networks, in a manner that eliminates the traffic signal interference in the supervision signal, is provided. A method for increasing the OTDR supervision distance range, wherein the converters are placed at route points where the optical signal from the OTDR reaches its useful attenuation limit and needs to be recovered, reducing the number of OTDRs utilized in the supervision system, is also provided.

2 Claims, 4 Drawing Sheets

ACTIVE WAVELENGTH CONVERTER FOR USE WITH AN OPTICAL TIME-DOMAIN REFLECTOMETER (OTDR) AND METHOD FOR INCREASING OTDR SUPERVISION DISTANCE RANGE

BACKGROUND

1. Technical Field of the Invention

In general, the present invention refers to a converter utilized to change the wavelength of optical signals generated by an OTDR to supervise optical networks, and a method for increasing the OTDR supervision distance range.

2. Description of Related Art

The use of optical fibers for short or long-distance digital signal transmission offers many advantages. The use of fiber is quite advantageous in relation to other transmission means such as radio, satellite, coaxial cable and twisted pairs. However, some physical effects limit optical fiber signal transmission such as, for example, the attenuation suffered by optical signals as they pass over the optical fiber. This well-known effect is mainly due to the light-scattering phenomenon known as Rayleigh scattering. The attenuation resulting from Rayleigh scattering depends mainly on the wavelength of the signal transmitted in the fiber and increases proportionally to the length of the fiber that the signal passes over.

The wavelength that least suffers attenuation when propagated over the optical fiber occurs in the optical spectrum region near 1550 nm. For this reason, this wavelength is one of the most utilized for measuring optical fiber attenuation characteristics.

The equipment utilized to supervise optical cables consists of an OTDR (Optical Time Domain Reflectometer), represented in FIG. 1, which is based on the analysis of the parcel of light backscattered by Rayleigh scattering. In the supervision process, the OTDR 1 transmits narrow pulse trains (10 µs to 10 ns), with a repetition interval on the order of a few kHz. This optical signal is generated by a semiconductor laser and transmitted to fiber 2 by means of an optical coupler 3. As the light is propagated along fiber 2, a parcel of it is being backscattered by the Rayleigh effect. This backscattering is captured by the OTDR 1, synchronized and displayed on the oscilloscope screen by means of curve A, as shown in FIG. 2, which represents the attenuation (dB) of the transmitted signal, according to the length of fiber (km) over which the signal passes. The OTDR 1 also measures the punctual reflections along the fiber. This characteristic is of fundamental importance for fault detection such as, for example, fiber break, bad splices, defective connections, etc.

OTDRs have been utilized frequently to examine the attenuation characteristics of the fiber before and after its installation as well as for quality control of fiber and optical cable at the manufacturer.

OTDRs are valuable tools for the carriers to assure preventive maintenance of installed links. The most updated optical communication systems reserve one fiber of the optical cable to be utilized by the OTDR. In this way, if a cable break occurs, it will be promptly detected and located by means of an automated supervision system that alerts maintenance teams of a defect occurrence. A limitation to this supervision method consists of the fact that there is not always a fiber available to be used exclusively by the OTDR. In such cases, the same fiber must be utilized for transmission of both normal traffic and supervision signals. However, this solution is not applicable to all optical communications systems since, in many cases, the communication signal interferes with the OTDR signal. When this happens, they must be separated by a filtering process and, in many cases, the OTDR signal must be changed to another emission spectrum band (wavelength), upper or lower to the communication signal, to allow more precise filtering.

Another limitation is related to the useful distance range of the optical supervision signal generated by the OTDR, limited to approximately 160 km of optical fiber, as shown in FIG. 2. This limitation requires one OTDR for every 160 km of supervised fiber. The supervision information is collected by the OTDRs and forwarded to the supervision center by means of the copper data network. This impedes the application of this solution in localities not serviced by the copper data network or implies in the necessity of taking the copper data network to these OTDRs. This solution significantly increases the price of the supervision system due to the need for additional OTDRs and to the expansion of the copper data network to service them.

Another issue related to the OTDRs is their elevated electric power consumption, making them unsuitable for regions without electric power supply.

BRIEF SUMMARY

For these reasons, the present invention has the purpose of providing an "ACTIVE WAVELENGTH CONVERTER TO BE USED WITH OTDR AND A METHOD FOR INCREASING THE OTDR SUPERVISION DISTANCE RANGE that:

a) allows the OTDR's original wavelength to be changed to a new wavelength, upper or lower to the traffic signal's wavelength, in a manner that eliminates the traffic signal interference in the supervision signal;

b) allows the extension of the OTDR supervision distance range without utilizing the copper data network;

c) reduces the number of OTDRs utilized in the supervision system;

d) reduces the utilization of copper data networks in the supervision system;

e) utilizes converters presenting low electric power consumption and that can be fed by alternative power sources, allowing their utilization in regions without electric power supply.

f) utilizes converters presenting low weight and volume, allowing their installation on poles, transmission towers and other similar applications;

g) utilizes low-cost implantation, operation and maintenance devices.

The proposed objectives and others are met by the "ACTIVE WAVELENGTH CONVERTER TO BE USED WITH OTDR", composed of: an optoelectronic circuit 5, comprising a photodetector 6, an amplifier 7, a comparator 8, a laser driver 9, an output laser 10, a laser temperature control circuit 11, and an optical circuit 12, composed of an optical fiber segment 13 with a filtering device 14. The converter 4a is composed of an optoelectronic circuit 5, connected in parallel to the optical circuit 12 by a coupler 15 and a circulator 16. The optical signal emitted by the OTDR 1 through fiber 2a is received by the coupler 15 and sent to the optoelectronic circuit 5, where it is converted from an optical to an electric signal, amplified, saturated, reformatted and converted back to an optical signal again, at a wavelength different from the signal emitted by the OTDR 1. It is then sent to the circulator 16 that transmits this changed signal to the optical fiber 2b, where it is propagated. Its backscattering is received by the circulator 16 that redirects it to the optical circuit 12, where it is filtered by the filtering device 14 and sent to the coupler 15 that directs this filtered backscattering to the OTDR 1 through the fiber 2a.

According to another characteristic of the present invention, the "METHOD FOR INCREASING THE OTDR SUPERVISION DISTANCE RANGE" consists of placing converters 4b at the route points in which the optical signal originated in the OTDR reached its useful attenuation limit and must be recovered. Each converter 4b is composed of an optoelectronic circuit 5, connected in parallel to an optical fiber segment 17, through the circulators 16 and 16b. The optical signal emitted by the OTDR 1, through fiber 2c, is received by the circulator 16a, recovered by the optoelectronic circuit 5 and transmitted by the circulator 16b to fiber 2d. The backscattering originated in fiber 2d is received by the circulator 16b, redirected through optical fiber 17 to the circulator 16a that, through fiber 2c, sends this backscattering in the direction of the signal origin.

BRIEF DESCRIPTION OF THE DRAWINGS

The invention will be better understood by reading the detailed description in the figures that refer to it, of which.

DETAILED DESCRIPTION

Figure 1:
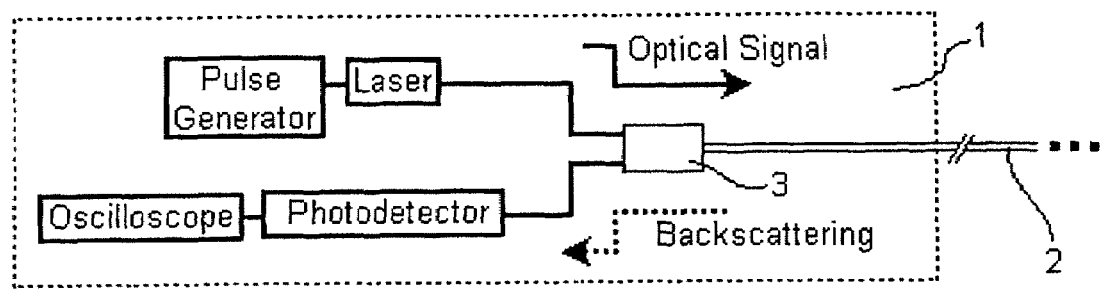
FIG. 1 represents the disposition of the functional blocks of the OTDR 1 in the previous technique.
Figure 2:
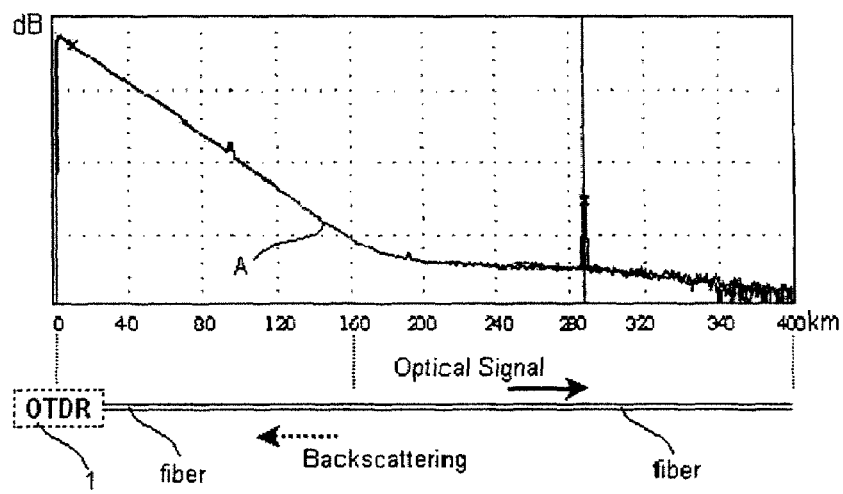
FIG. 2 represents the backscattering reading of the signal emitted by the OTDR 1 referred to in the previous technique.
Figure 3:
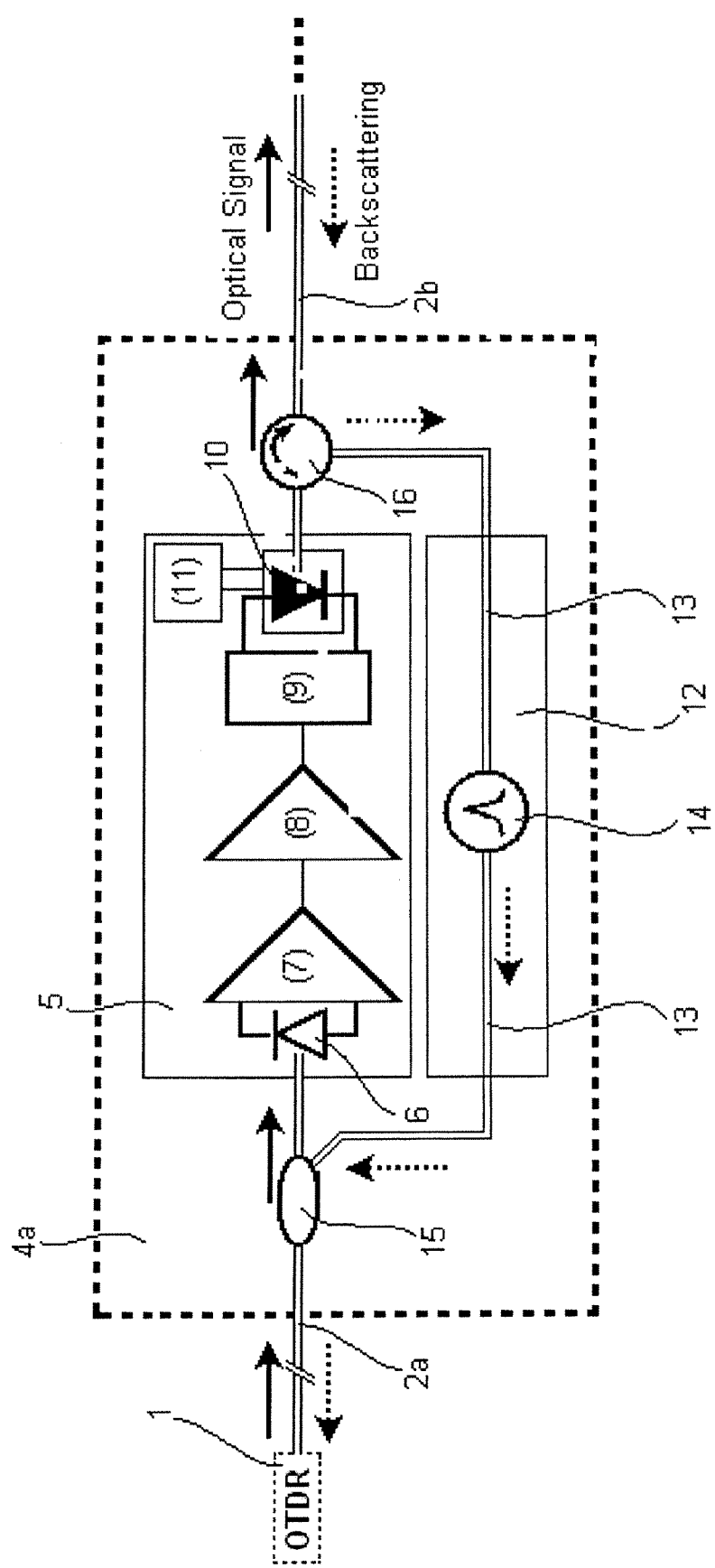
FIG. 3 represents the disposition of the functional blocks of the wavelength converter 4a for the OTDR in one of their possible implementation ways.

According to the principles of this invention, the "ACTIVE WAVELENGTH CONVERTER FOR USE WITH OTDR", represented in FIG. 3, showing one of its possible implementation ways 4a, is composed of an input optical power divider 15 that, through optical fiber 2a, receives the signal from the OTDR 1 and sends it to the optoelectronic circuit 5, where the photodetector 6 converts this optical signal into a digital electric signal that is sent to the electric signal amplifier 7, which may or may not be incorporated to the photodetector 6, said amplifier 7, where the digital electric signal has its voltage level elevated to approximately one Volt, after which the digital electric signal in reference is directed to the comparator 8 that saturates and reformats it, making it practically insensitive to the variations of input power levels. The signal is then sent to the laser driver 9 that controls the power transmitted by the output laser 10 that then converts this digital electric signal into a recovered and modified optical signal for a wavelength different from the signal emitted by the OTDR 1. This recovered and modified optical signal is then directed to the circulator 16 that transmits it to the supervised fiber 2b, where it is propagated. Its backscattering is received by the circulator 16 that redirects it to the optical circuit 12, where it is filtered by the filtering device 14 that removes the interferences undesirable to the OTDR 1, after which the filtered backscattering is sent to the coupler 15 that, through fiber 2a, transmits it to the OTDR.

In the present concept, the change of the OTDR 1 wavelength signal occurs in the optoelectronic circuit 5, through the output laser 10 that is selected in a manner to emit light in the power and in the wavelength adequate to the application of the converter 4a, said wavelength, which is different from the traffic signal present in the supervised route. The temperature of the output laser 10 is monitored and controlled through an electronic circuit 11 that measures the temperature of a thermistor-type sensor and controls it with a "Peltier" cooler placed near the laser light source, thus extending the useful life of the output laser 10.

Figure 4:
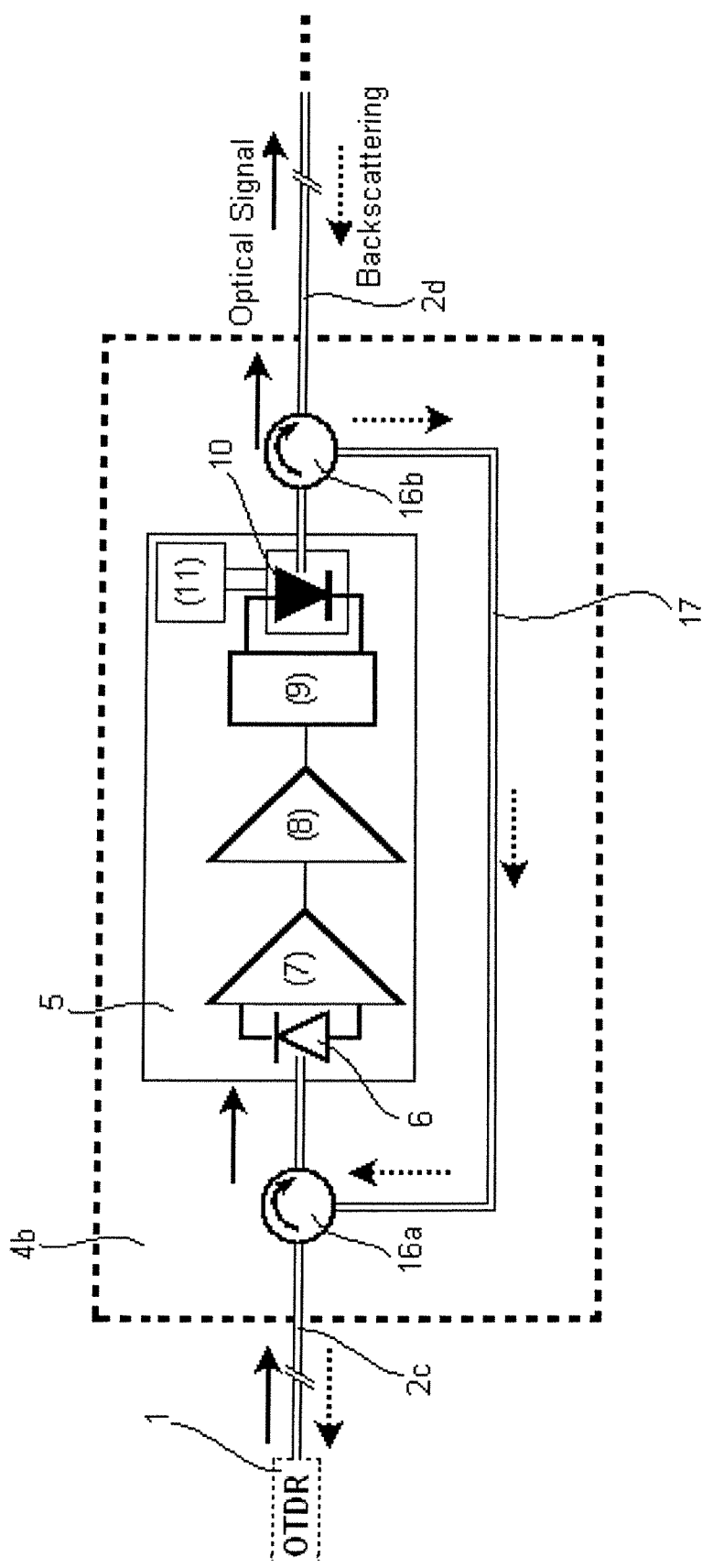
FIG. 4 represents the disposition of the converter 4b functional blocks for OTDR in one of their possible implementation ways.
Figure 5:
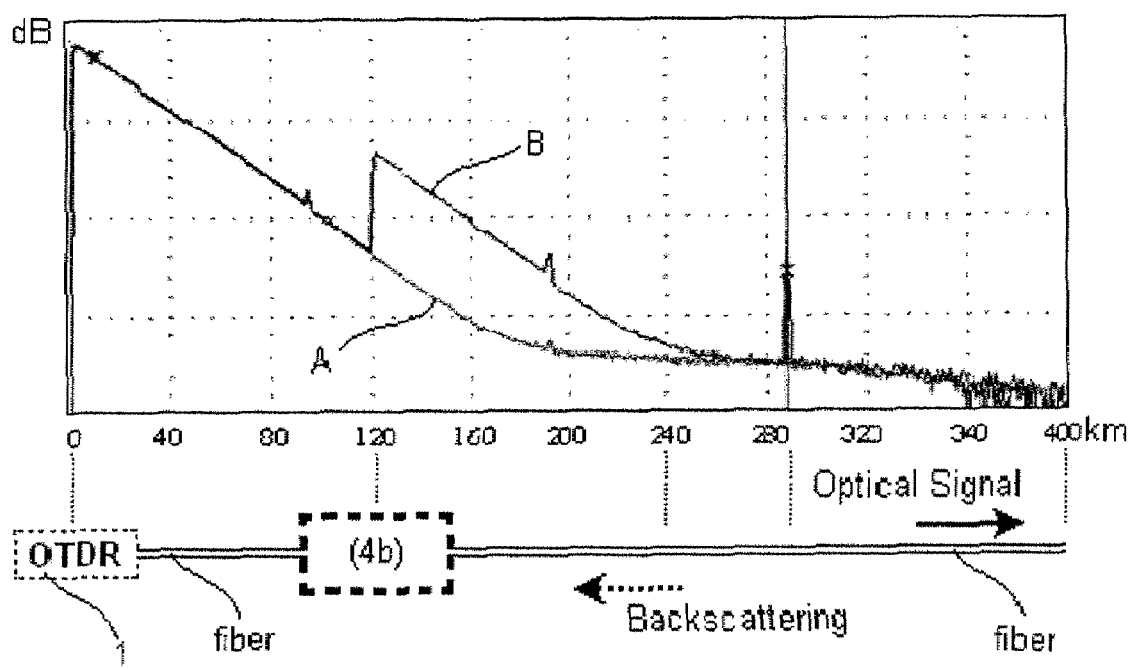
FIG. 5 represents the reading of the backscattering concerning the signal emitted by the OTDR 1, recovered by the converter 4b, according to one of the invention's possible implementation ways.

According to another characteristic of the present invention, the "METHOD FOR INCREASING THE OTDR SUPERVISION DISTANCE RANGE", represented in FIG. 5, consists of placing at least one converter 4b at the route point in which the attenuated optical signal from an OTDR 1 or a previous converter 4a or 4b must be recovered. Each converter 4b (FIG. 4) is composed of an optoelectronic circuit 5, connected in parallel to an optical fiber segment 17, through a circulator 16a, recovered by the optoelectronic circuit 5 and sent forward by the circulator 16b. The backscattering is received by the circulator 16b, redirected through optical fiber 17 to the circulator 16a that then sends this backscattering in the direction of the signal origin.

Practical measurements performed through the OTDR 1, and represented in FIG. 5, demonstrate that, through the utilization of a converter 4b, it is possible to increase the OTDR 1 supervision distance range from 160 km to approximately 240 km of optical fiber. This range can be increased even more by using additional converters 4b, placed in series, at the route points in which the signal needs to be recovered.

Although the invention has been described in connection with certain preferred realization modalities, it should be understood that the invention is not intended to be limited to those particular modalities. On the contrary, the intention is to cover all of the alternatives, modifications and equivalencies possible within the spirit and the scope of the invention.

The invention claimed is:

1. A method for increasing the supervision distance range of an optical-time domain reflectometer (OTDR) in an optical link by placing active wavelength converters in determined link points where an optical signal from the OTDR reaches an attenuation limit and requires recovery, comprising at least one active wavelength converter wherein, inside the at least one converter, an optoelectronic circuit receives and reworks the optical signal coming from the OTDR and converts it into a digital electric signal which is amplified, reformatted, and then converted into a recovered optical signal, at a wavelength substantially the same as that emitted by the OTDR.

2. The method according to claim 1, wherein, inside the at least one converter, the recovered optical signal is directed to an output circulator that transmits the signal to a supervised fiber, in which the signal is propagated; and a backscattering of the propagated signal is received by the output circulator which redirects the backscattered signal to another circulator placed at a converter input, the another circulator then sends the backscattering signal to the OTDR through the supervised optical fiber.

* * * * *